(12) United States Patent
Suetani et al.

(10) Patent No.: US 9,327,660 B2
(45) Date of Patent: May 3, 2016

(54) WIRING HARNESS

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Masaharu Suetani, Yokkaichi (JP); Kouji Fukumoto, Yokkaichi (JP); Daisuke Hashimoto, Yokkaichi (JP); Takuya Tate, Yokkaichi (JP); Yoshitomo Tsujii, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days.

(21) Appl. No.: 14/389,784

(22) PCT Filed: Dec. 28, 2012

(86) PCT No.: PCT/JP2012/084037
§ 371 (c)(1),
(2) Date: Oct. 1, 2014

(87) PCT Pub. No.: WO2013/150693
PCT Pub. Date: Oct. 10, 2013

(65) Prior Publication Data
US 2015/0122543 A1    May 7, 2015

(30) Foreign Application Priority Data

Apr. 4, 2012  (JP) .................................. 2012-085096

(51) Int. Cl.
*H01R 24/00*  (2011.01)
*B60R 16/02*  (2006.01)
*H01R 13/504*  (2006.01)
*H02G 15/04*  (2006.01)
*H01B 7/40*  (2006.01)
*H02G 15/076*  (2006.01)
*H01R 13/58*  (2006.01)

(52) U.S. Cl.
CPC .............. *B60R 16/0207* (2013.01); *H01B 7/40* (2013.01); *H01R 13/504* (2013.01); *H02G 15/046* (2013.01); *H02G 15/076* (2013.01); *H01R 13/582* (2013.01)

(58) Field of Classification Search
USPC .......................................... 439/626; 174/659
See application file for complete search history.

(56) References Cited

U.S. PATENT DOCUMENTS

2002/0125033 A1\* 9/2002 Blake ....................... H02G 3/18
                                                            174/653
2003/0094301 A1\* 5/2003 Takedomi ................. F16L 5/10
                                                            174/659

FOREIGN PATENT DOCUMENTS

| JP | 11-329572 | | 11/1999 |
|---|---|---|---|
| JP | 11329572 A | * | 11/1999 |
| JP | 2001-257026 | | 9/2001 |
| JP | 2006-066217 | | 3/2006 |
| JP | 2006066217 A | * | 3/2006 |
| JP | 2006-123458 | | 5/2006 |

\* cited by examiner

*Primary Examiner* — Timothy Thompson
*Assistant Examiner* — Krystal Robinson
(74) *Attorney, Agent, or Firm* — Gerald E. Hespos; Michael J. Porco; Matthew T. Hespos (57) ABSTRACT

A wiring harness (1) includes a housing (2) for holding protected parts each including a connected part of an insulated wire (90) and a terminal fitting (91) in a plurality of terminal-provided wires (9) at intervals inside. The housing (2) has a double structure including an inner wire protecting member (30) and an outer wire protecting member (10). The inner wire protecting member (30) holds the protected parts of the plurality of terminal-provided wires (9), each in a pivotable state, at intervals. The outer wire protecting member (10) is formed by insert molding a thermoplastic material with the inner wire protecting member (30) holding the plurality of terminal-provided wires (9) as an insert part.

4 Claims, 10 Drawing Sheets

WIRING HARNESS

BACKGROUND

1. Field of the Invention

The present invention relates to a wiring harness to be mounted in a vehicle.

2. Description of the Related Art

Insulated wires to be mounted in a vehicle such as an automotive vehicle are often provided in the form of a wiring harness including a plurality of insulated wires. Further, a wiring harness includes terminal-provided wires each composed of an insulated wire and a terminal fitting connected to an end of the insulated wire, and a nonconductive wire protecting member formed near the ends of the terminal-provided wires in some cases.

The wire protecting member is a non-conductive member for holding some protected parts, each including a connected part of the insulated wire and the terminal fitting, in the terminal-provided wires inside. Generally, the wire protecting member often holds some protected parts, each including the connected part of the insulated wire and the terminal fitting, in a plurality of terminal-provided wires arranged in parallel at intervals in a certain positional relationship inside.

The wiring harness may further include an electromagnetic shield member such as a braided wire and a conductive bracket member to be held in contact with the shield member. The wire protecting member or a set of the wire protecting member and the bracket member is normally provided near end parts of the plurality of insulated wires arranged in parallel on each side.

The wire protecting member of the wiring harness is fixed to an edge part of an opening on a casing directly or via a bracket member. The wire protecting member of the wiring harness is called a housing, a connector or the like.

Further, as described in Japanese Unexamined Patent Publication No. 2006-123458, the wire protecting member may be formed of a synthetic resin member formed by insert molding depending on required specification such as rigidity or sealability level. In this case, synthetic resin is insert-molded with the protected parts of the plurality of terminal-provided wires or the protected parts and the bracket member as an insert part.

In the conventional wiring harness, if the wire protecting member is a member obtained by insert molding, the protected parts of the terminal-provided wires as the insert part are entirely held in close contact with the wire protecting member. Thus, if the wire protecting member is fixed to a casing or the like, the positions of the terminal fittings of the terminal-provided wires are also fixed. Further, if the wire protecting member holds the protected parts of the plurality of terminal-provided wires inside, the terminal fittings of the plurality of terminal-provided wires are held in a state where the mutual positional relationship thereof is fixed.

However, in the wiring harness and a connection partner of the wiring harness, the wire protecting member, the terminal fittings and mating terminals as connection partners of the terminal fittings and the like are subject to dimensional variations. Thus, if the wire protecting member is fixed to the terminal-provided wires, it may be difficult to connect the terminal fittings and the mating terminals due to dimensional variations.

The present invention aims to enable a fine adjustment of the position of a terminal fitting while adopting an insert-molded member excellent in rigidity and sealability in a wiring harness including a wire protecting member for holding a connected part of a wire and a terminal fitting of a terminal-provided wire inside.

SUMMARY OF THE INVENTION

A wiring harness according to a first aspect of the present invention has a terminal-provided wire including an insulated wire and a terminal fitting connected to an end of the insulated wire. The wiring harness further has a wire protecting member for covering a protected part including a connected part of the insulated wire and the terminal fitting of the terminal-provided wire. This wire protecting member has a double structure including an inner member and an outer member. The inner member is a non-conductive member for holding the protected part of the terminal-provided wire in a pivotable state inside. The outer member is a member formed by insert molding a thermoplastic material with the inner member holding the terminal-provided wire as an insert part. Such an outer member is excellent in rigidity and sealability. Further, the inner member constituting the wire protecting member holds the protected part including the terminal connected part in the terminal-provided wire in a pivotable state inside. Thus, the position of the terminal fitting of the terminal-provided wire can be finely adjusted within a range where the protected part held by the inner member is pivotable.

The inner member of the wiring harness may be a hard member. Further, the inner member may include the following fixing portion and accommodating portion. The fixing portion may be a part for fixing and holding a part of the insulated wire on an end opposite to the terminal fitting in the protected part of the terminal-provided wire inside. The accommodating portion may be a part for accommodating a remaining part of the protected part of the terminal-provided wire with a play. More particularly, a part of the terminal-provided wire from the part fixed by the wire fixing portion of the inner member to the terminal fitting at the end may be displaceable due to the flexibility of the insulated wire. Furthermore, the range of position adjustment of the terminal fitting (displaceable range) may be limited within a range of the play of the accommodating portion of the inner member. Thus, when the terminal fitting is coupled and fixed to a mating terminal, a stress generated on the insulated wire is suppressed to a very low level and a reaction force applied to the fixed terminal fitting also is suppressed to a very low level. As a result, problems such as the deterioration of the terminal fitting and loosened coupling between the terminal fitting and the mating terminal due to the reaction force applied to the terminal fitting are unlikely to occur.

The fixing portion of the inner member may be a part formed with a through hole through which a part of the insulation coating of the terminal-provided wire is passed, and an edge part of the through hole may bite into the outer peripheral surface of the insulation coating over the entire circumference. Specifically, an entrance for the insulated wire in the inner member may be formed to have a smaller inner diameter than an outer diameter of the insulated wire so that no clearance is formed at the entrance for the insulated wire. Thus, an inconvenience that the molten thermoplastic material flows into the inner member through the clearance at the entrance for the insulated wire in the inner member during insert molding of the outer member is unlikely to occur.

The inner member may be formed of a resilient member for covering the protected part of the terminal-provided wire by being held in close contact therewith. Thus, the sealability of the protected parts of a plurality of terminal-provided wires is increased further.

The inner member may have a different color from the outer member, and a part of the inner member may be exposed from the outer member. Thus, a state of the part of the inner member exposed from the outer member can be confirmed easily. Therefore, whether or not a molded state of the outer member is good can be determined by confirming the state of the exposed part of the inner member

BRIEF DESCRIPTION OF THE DRAWINGS

FIGS. 1a to 1e are orthographic views of an end part of a wiring harness according to an embodiment of the present invention.

FIGS. 2a to 2e are orthographic views of an inner wire protecting member provided in the wiring harness.

FIGS. 4a to 4e are orthographic views of a base body constituting the inner wire protecting member.

FIGS. 5a to 5e are orthographic views of a lid body constituting the inner wire protecting member 30.

DETAILED DESCRIPTION

Hereinafter, an embodiment of the present invention is described with reference to the accompanying drawings. The following embodiment is one specific example of the present invention and not intended to limit the technical scope of the present invention.

First, with reference to FIGS. 1 to 5, the configuration of a wiring harness 1 according to the embodiment of the present invention is described. The wiring harness 1 is, for example, a high-voltage system wiring harness laid between an inverter circuit and a motor or between a charging port and a charging circuit in an electrically driven vehicle such as a hybrid vehicle or an electric vehicle.

Figure 1A:
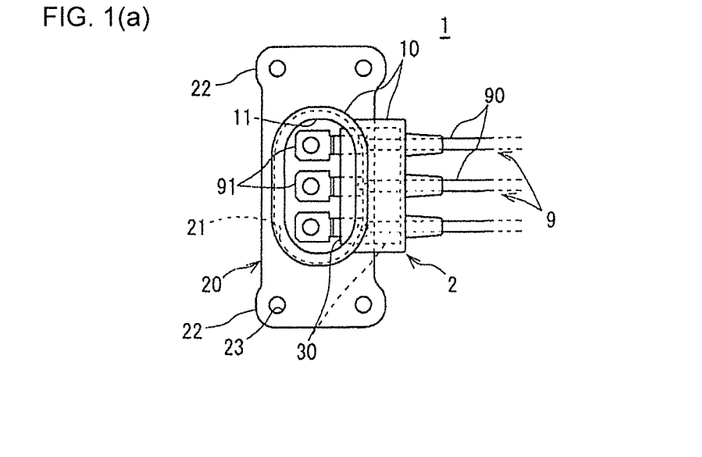
Figure 1B:
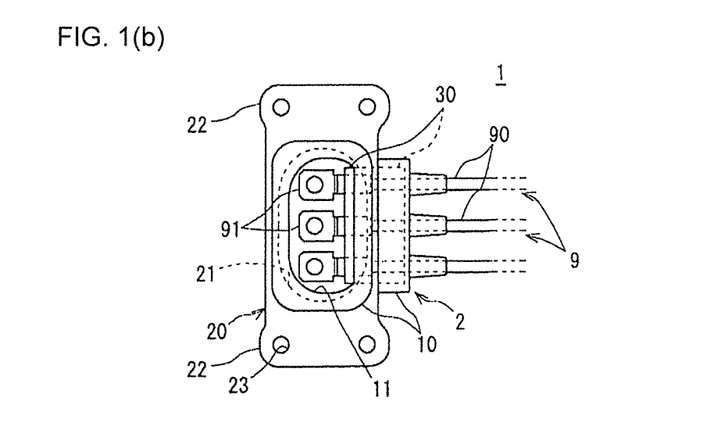
Figure 1C:
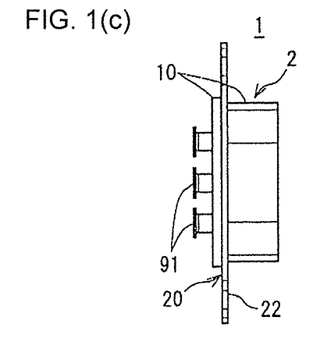
Figure 1D:
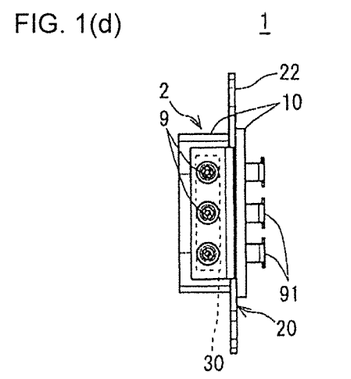
Figure 1E:
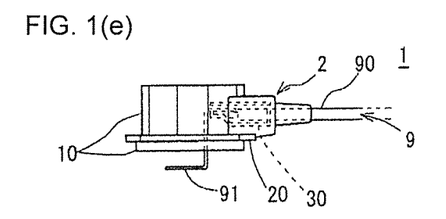
Figure 2A:
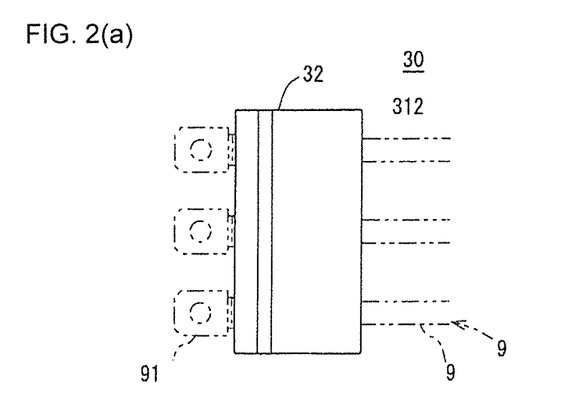
Figure 2B:
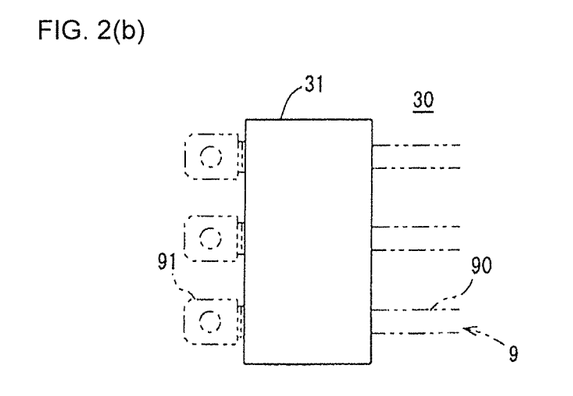
Figure 2C:
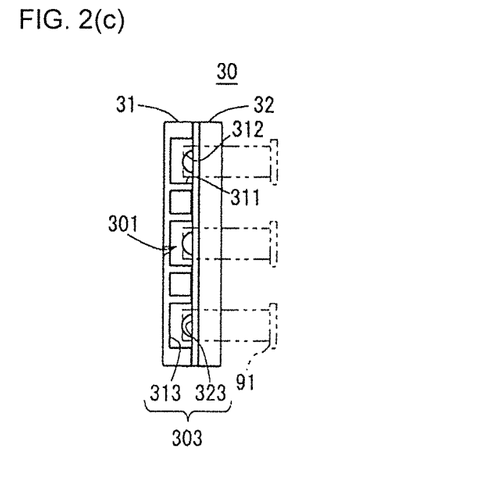
Figure 2D:
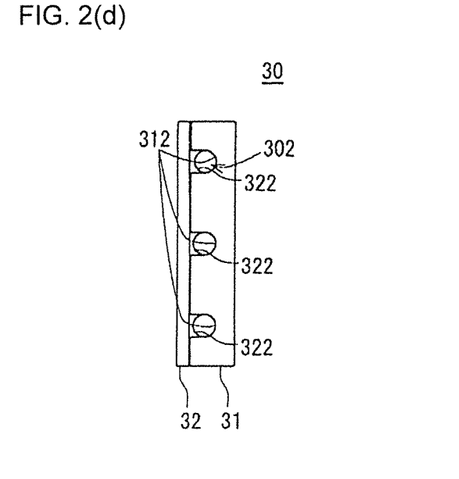
Figure 2E:
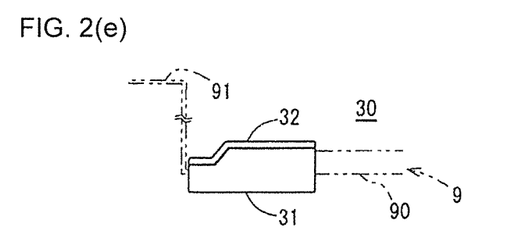
Figure 4A:
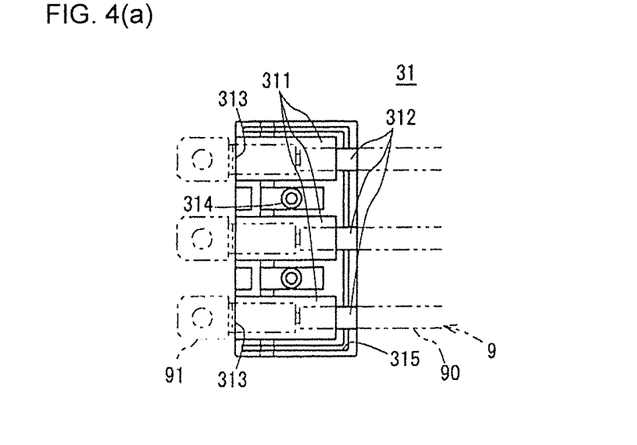
Figure 4B:
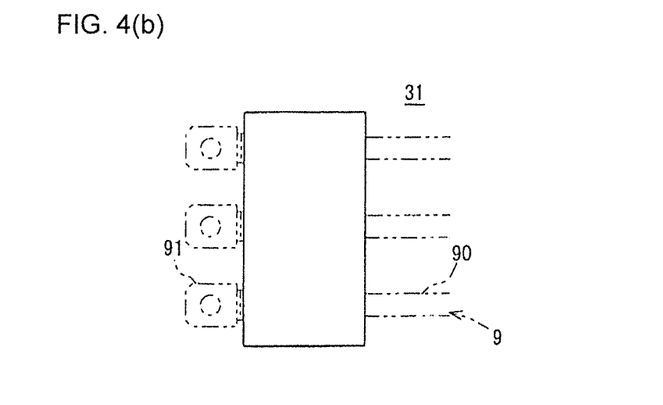
Figure 4C:
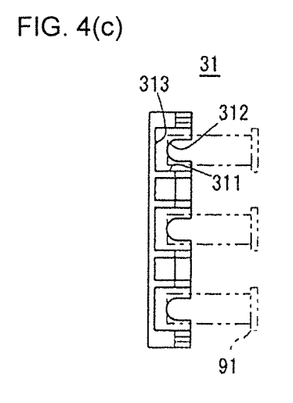
Figure 4D:
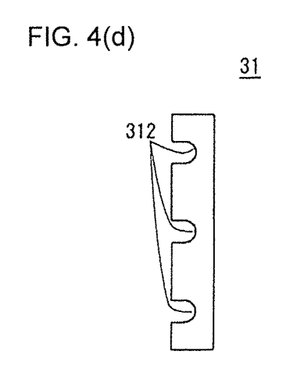
Figure 4E:
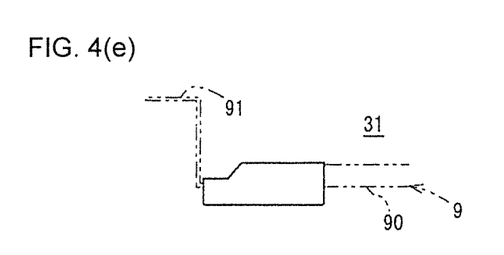
Figure 5A:
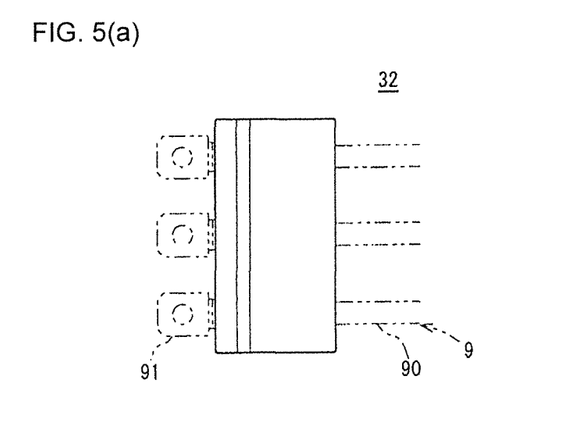
Figure 5B:
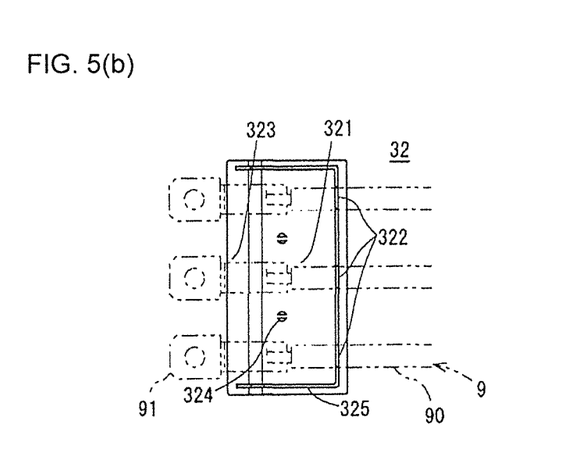
Figure 5C:
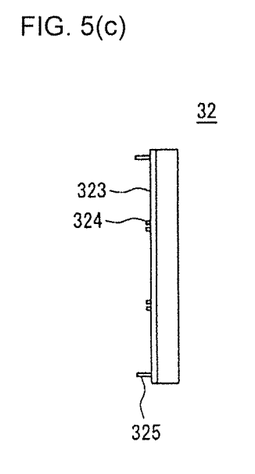
Figure 5D:
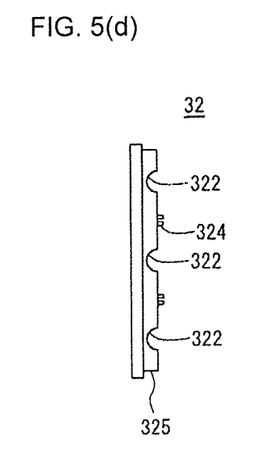
Figure 5E:
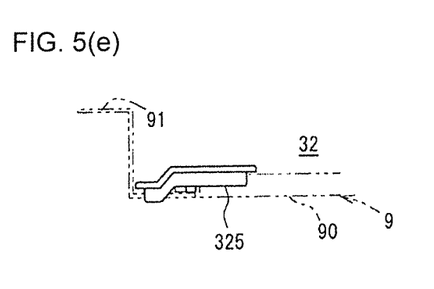

Note that, in orthographic views of an end part of the wiring harness 1 shown in FIG. 1, FIG. 1(a) is a plan view, FIG. 1(b) is a bottom view, FIG. 1(c) is a front view, FIG. 1(d) is a rear view and FIG. 1(e) is a side view. Similarly, in orthographic views of an inner wire protecting member 30 shown in FIG. 2, FIG. 2(a) is a plan view, FIG. 2(b) is a bottom view, FIG. 2(c) is a front view, FIG. 2(d) is a rear view and FIG. 2(e) is a side view. Similarly, in orthographic views of a base body 31 of the inner wire protecting member 30 shown in FIG. 4, FIG. 4(a) is a plan view, FIG. 4(b) is a bottom view, FIG. 4(c) is a front view, FIG. 4(d) is a rear view and FIG. 4(e) is a side view. Similarly, in orthographic views of a lid body 32 of the inner wire protecting member 30 shown in FIG. 5, FIG. 5(a) is a plan view, FIG. 5(b) is a bottom view, FIG. 5(c) is a front view, FIG. 5(d) is a rear view and FIG. 5(e) is a side view.

As shown in FIG. 1, the wiring harness 1 includes a plurality of terminal-provided wires 9 and a set of a housing 2 and a bracket member 20 provided on end parts of the terminal-provided wires 9.

Figure 3:
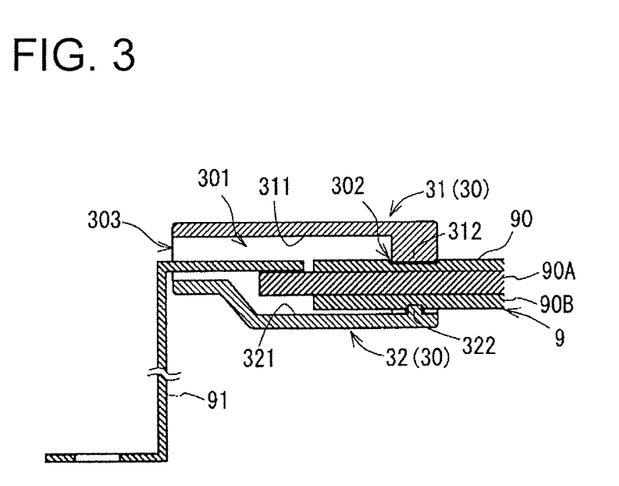
FIG. 3 is a section of a terminal-provided wire mounted with the inner wire protecting member.

The terminal-provided wire 9 includes an insulated wire 90 and a terminal fitting 91 connected to an end of the insulated wire 90. As shown in FIG. 3, the insulated wire 90 is composed of a core 90A made of an electrically conductive material and an insulation coating 90B made of an insulating material for covering the core 90A. The terminal fitting 91 is connected to the core 90A at an end part of the insulated wire 90. Note that, in an example shown in FIG. 1, the wiring harness 1 includes three terminal-provided wires 9 arranged in parallel. However, the wiring harness 1 may include two, four or more terminal-provided wires 9.

The housing 2 is a member for holding parts of the plurality of terminal-provided wires 9 including connected parts of the insulated wires 90 and the terminal fittings 91 at intervals inside. Further, the housing 2 holds the plurality of terminal-provided wires 9 and the bracket member 20 in a certain positional relationship. Further, the housing 2 has a double structure including an inner wire protecting member 30 and an outer wire protecting member 10. Note that the housing 2 is an example of a wire protecting member.

In the following description, the connected part of the insulated wire 90 and the terminal fitting 91 is referred to as a terminal connected part. Further, parts of the plurality of terminal-provided wires 9 held by the inner wire protecting member 30 of the housing 2 are referred to as protected parts. The protected part is an area of each terminal-provided wire 9 from an end part of the insulated wire 90B to a part of the terminal fitting 91 and includes the terminal connected part.

Normally, the wiring harness 1 includes two housings 2 provided near the opposite end parts of the plurality of terminal-provided wires 9 arranged in parallel.

The inner wire protecting member 30 is a non-conductive member for holding the protected parts of the plurality of terminal-provided wires 9, each in a pivotable state, at intervals inside. More specifically, the inner wire protecting member 30 is a hard member made of non-conductive synthetic resin. For example, the inner wire protecting member 30 is made of synthetic resin such as polypropylene (PP), polyethylene (PE), polyvinyl chloride (PVC), polyethylene terephthalate (PET) or polyamide (PA).

The inner wire protecting member 30 is formed into a container for accommodating the protected parts of the plurality of terminal-provided wires 9 by combining two members. More specifically, the inner wire protecting member 30 is composed of the base body 31 and the lid body 32 combined in such a state as to sandwich the protected parts of the plurality of terminal-provided wires 9.

FIGS. 2 and 3 show the inner wire protecting member 30 including the combined base body 31 and lid body 32. FIGS. 4 and 5 respectively show the base body 31 and the lid body 32 before being combined. Note that the terminal-provided wires 9 are shown in imaginary line (chain double-dashed line) in FIGS. 2, 4 and 5.

As shown in FIG. 4, the base body 31 of the inner wire protecting member 30 is formed with a plurality of accommodating recesses 311 partitioned by partition walls. A wire fixing portion 312, which is a recess into which a part of the insulation coating 90B of the insulated wire 90 is to be fitted, is formed on one end part of each accommodating recess 311. Further, a fitting arranging recess 313, which is a recess in which a part of the terminal fitting 91 of the terminal-provided wire 9 is to be arranged, is formed on the other end of each accommodating recess 311.

Further, the base body 31 of the inner wire protecting member 30 is formed with projection receiving portions 314 forming recesses, into which coupling projections 324 of the lid body 32 to be described later are to be fitted. Further, a rib inserting portion 315, which is a recess into which a rib 325 of the lid body 32 to be described later is to be inserted, is formed on an outer edge part of the base body 31.

On the other hand, the lid body 32 of the inner wire protecting member 30 is a member for closing openings of the plurality of accommodating recesses 311 of the base body 31. As shown in FIG. 5, the lid body 32 is formed with a ceiling plate portion 321 for closing the openings of the plurality of accommodating recesses 311 of the base body 31.

As shown in FIG. 3, the accommodating recesses 311 of the base body 31 and the ceiling plate portion 321 of the lid body 32 form wire accommodating portions 301 for accommodating the terminal connected parts of the respective terminal-provided wires 9 in a state where the base body 31 and the lid body 32 are combined.

Further, as shown in FIG. 5, the lid body 32 is formed with the coupling projections 324, which are projections to be fitted into the recesses of the projection receiving portions 314 of the base body 31. By fitting the coupling projections 324 into the recesses of the projection receiving portions 314 of the base body 31, the lid body 32 is coupled to the base body 31 and held in a state to close the openings of the plurality of accommodating recesses 311 of the base body 31.

Further, the rib 325 to be inserted into the rib inserting portion 315 of the base body 31 is formed on an outer edge part of the lid body 32. The lid body 32 is combined with the base body 31 in a state where the rib 325 is inserted in the rib inserting portion 315 of the base body 31. This rib 325 prevents the intrusion of molten resin into the wire accommodating portions 301 during insert molding with the inner wire protecting member 30 as an insert part.

Further, wire fixing portions 322, which are recesses into which parts of the insulation coatings 90B of the insulated wires 90 are to be fitted, are formed on parts of the rib 325 facing the wire fixing portions 312 of the base body 31.

In the inner wire protecting member 30 formed by the coupled base body 31 and lid body 32, each of a plurality of sets of wire fixing portions 312, 322 is a part for fixing and holding a part of the insulated wire 90 on an end opposite to the terminal fitting 91 in the protected part of each terminal-provided wire 9.

Further, an end part 323 of the ceiling plate portion 321 of the lid body 32 faces the fitting arranging recesses 313 of the base body 31 and form terminal enclosing portions 303 together with the fitting arranging recesses 313. The terminal enclosing portions 303 form openings through which the terminal fittings 91 are passed.

Further, in the inner wire protecting member 30, the wire accommodating portions 301 formed by the accommodating recesses 311 and the ceiling plate portion 321 are parts for loosely accommodating remaining parts of the protected parts of the plurality of terminal-provided wires 9 excluding the parts fixed by the wire fixing portions 312, 322. Specifically, as shown in FIG. 3, a small clearance is formed around the terminal-provided wire 9 in the wire accommodating portion 301. The terminal connected part of each terminal-provided wire 9 is pivotable within a range of a play (clearance) in the wire accommodating portion 301.

As shown in FIG. 2(d), the wire fixing portions 312 of the base body 31 and the wire fixing portions 322 of the lid body 32 form through holes 302 through which parts including the insulation coatings 90B in the insulated wires 90 of the terminal-provided wires 9 are passed in a state where the base body 31 and the lid body 32 are combined.

An inner diameter of the through hole 302 is smaller than an outer diameter of the part including the insulation coating 90B in the insulated wire 90. Thus, as shown in FIG. 3, the wire fixing portions 312, 322 forming edge parts of the through holes 302 bite into the outer peripheral surfaces of the insulation coatings 90B of the insulated wires 90 over the entire circumference in the wiring harness 1. Specifically, no clearance is formed at the entrances for the insulated wires 90 in the inner wire protecting member 30.

Further, the outer wire protecting member 10 is a member formed by insert molding a thermoplastic material with the inner wire protecting member 30 holding the bracket member 20 and the plurality of terminal-provided wires 9 as an insert part. Thus, the outer wire protecting member 10 is formed outside the inner wire protecting member 30.

In the example shown in FIG. 1, the outer wire protecting member 10 is formed with an opening 11 for allowing access to the terminal fittings 91 of the terminal-provided wires 9. This opening 11 is closed by an unillustrated lid member after the terminal fittings 91 are connected to terminal portions of a mating device by screws or the like.

For example, the outer wire protecting member 10 is made of synthetic resin such as polypropylene (PP), polyethylene (PE), polyvinyl chloride (PVC), polybutylene terephthalate (PBT) or polyamide (PA).

The outer wire protecting member 10 is normally made of a non-conductive material. However, the outer wire protecting member 10 may be made of an electrically conductive material so as to be electrically connected to the bracket member 20 to be described later. The electrically conductive outer wire protecting member 10 may be made of thermoplastic synthetic resin mixed with electrically conductive fibers or powder. The electrically conductive fibers or power may be carbon fibers, stainless steel fibers or carbon powder.

As shown in FIG. 1, parts of the inner wire protecting member 30 is exposed from the outer wire protecting member 10 in the housing 2. More specifically, at least the terminal enclosing portions 303 of the inner wire protecting member 30 are exposed from the outer wire protecting member 10. The terminal enclosing portions 303 are edge parts of openings, from which the terminal fittings 91 project outwardly, in the inner wire protecting member 30.

In the housing 2, the inner wire protecting member 30 and the outer wire protecting member 10 are preferably members having different colors. In that case, states of the parts of the inner wire protecting member 30 exposed from the outer wire protecting member 10 can be easily confirmed.

The bracket member 20 is an electrically conductive member integrally combined with the outer wire protecting member 10 of the housing 2. For example, the bracket member 20 is a member made of metal such as stainless steel or iron. A main body portion of the bracket member 20 is formed with a through hole 21 for allowing access to the terminal fittings 91 of the terminal-provided wires 9. The opening 11 of the outer wire protecting member 10 is formed inside the through hole 21 of the bracket member 20.

Further, the bracket member 20 includes a coupling portion 22 formed to project outwardly from the main body portion held in the housing 2. The coupling portion 22 is a part structured to be coupled to an unillustrated electrically conductive casing. The mating device to which the terminal fittings 91 of the terminal-provided wires 9 are to be connected is accommodated in the casing.

In the example shown in FIG. 1, the coupling portion 22 of the bracket member 20 is a jaw-like part formed with screw holes 23 through which screws are inserted to couple the coupling portion 22 to the casing. The coupling portion 22 is coupled to a part of the casing around an opening, through which the terminal-provided wires 9 are passed, by the screws.

Further, the wiring harness 1 includes an unillustrated electromagnetic shield member if necessary. The electromagnetic shield member is an electrically conductive member for collectively surrounding parts of the insulated wires 90 in the plurality of terminal-provided wires 9. The electromagnetic shield member is, for example, a braided wire. An end part of the electromagnetic shield member is electrically connected to the bracket member 20.

For example, the electromagnetic shield member is connected to the bracket member 20 via a wire. Further, if the outer wire protecting member 10 of the housing 2 is an electrical conductive member, the end part of the electromagnetic shield member may be fixed to the outer wire protecting member 10.

In the wiring harness 1, the outer wire protecting member 10 constituting the housing 2 (wire protecting member) is a member obtained by insert molding. Thus, the outer wire protecting member 10 is excellent in rigidity and sealability. Further, the inner wire protecting member 30 constituting the housing 2 holds the protected parts including the terminal connected parts in the plurality of terminal-provided wires 9, each in a pivotable state, inside. Thus, the position of the terminal fitting 91 of each of the plurality of terminal-provided wires 9 can be finely adjusted within a range where the protected part held by the inner wire protecting member 30 is pivotable.

Further, in the wiring harness 1, a part of each terminal-provided wire 9 from the part fixed by the wire fixing portions 312, 322 of the inner wire protecting member 30 to the terminal fitting 91 at the end is displaceable due to the flexibility of the insulated wire 90. Further, the range of position adjustment of the terminal fitting 91 (displaceable range) is limited within the range of the play of the wire accommodating portion 301 of the inner wire protecting member 30.

Accordingly, when the terminal fitting 91 is coupled and fixed to the mating terminal by adopting the wiring harness 1, a stress generated on the insulated wire 90 is suppressed to a very low level and a reaction force applied to the fixed terminal fitting 91 is also suppressed to a very low level. As a result, problems such as the deterioration of the terminal fitting 91 and loosened coupling between the terminal fitting 91 and the mating terminal due to the reaction force applied to the terminal fitting 91 are unlikely to occur.

Further, the edge part of the through hole 302 bites into the outer peripheral surface of the insulation coating 90B over the entire circumference in the wire fixing portions 312, 322 of the inner wire protecting member 30. The entrance for the insulated wire 90 in the inner wire protecting member 30 is formed to have a smaller inner diameter than the outer diameter of the insulated wire 90 and no clearance is formed at the entrance for the insulated wire 90. Thus, an inconvenience that the molten thermoplastic material flows into the wire accommodating portion 301 through the clearance at the entrance for the insulated wire 90 in the inner wire protecting member 30 during insert molding of the outer wire protecting member 10 is unlikely to occur.

Further, if the inner and outer wire protecting members 30, 10 constituting the housing 2 are formed in different colors in the wiring harness 1, the states of the parts of the inner wire protecting member 30 exposed from the outer wire protecting member 10 can be easily confirmed. In this case, whether or not a molded state of the outer wire protecting member 10 is good can be determined by confirming the states of the exposed parts of the inner wire protecting member 30.

Figure 6:
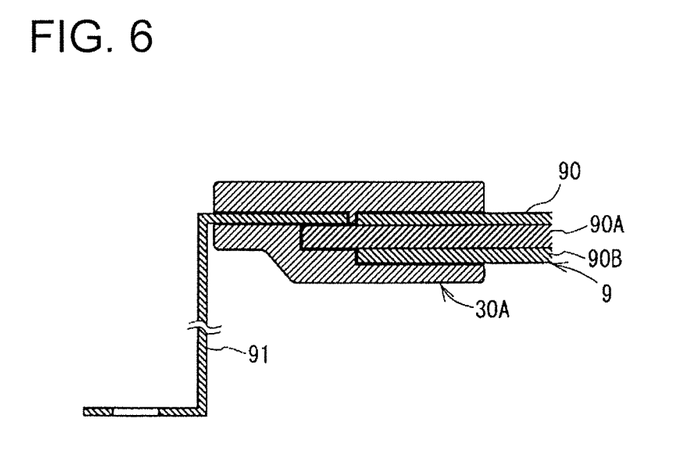
FIG. 6 is a section of the terminal-provided wire mounted with an inner wire protecting member according to an application example applicable to the wiring harness.

Next, an inner wire protecting member 30A adoptable instead of the inner wire protecting member 30 in the wiring harness 1 is described with reference to FIG. 6. Note that FIG. 6 is a section of the terminal-provided wire 9 mounted with the inner wire protecting member 30A according to an application example.

The inner wire protecting member 30A according to the application example is formed of a non-conductive resilient member for covering the protected parts of the plurality of terminal-provided wires 9 while being held in close contact therewith. For example, the inner wire protecting member 30A may be made of thermoplastic elastomer or vulcanized rubber.

The inner wire protecting member 30A formed of the resilient member also holds the protected parts of the plurality of terminal-provided wires 9, each in a pivotable state, at intervals inside similarly to the inner wire protecting member 30. Specifically, a stress for position adjustment is applied to the terminal fitting 91 of the terminal-provided wire 9, the inner wire protecting member 30A is resiliently deformed, whereby the protected part of each terminal-provided wire 9 held in the inner wire protecting member 30A is displaced.

In the case of adopting the inner wire protecting member 30A in the wiring harness 1, the inner wire protecting member 30A formed of the resilient member covers the protected parts of the plurality of terminal-provided wires 9 by being held in close contact therewith. In this case, the sealability of the protected parts in the plurality of terminal-provided wires 9 is increased. As a result, dustproof and waterproof performance of the terminal connected parts of the terminal-provided wires 9 is improved.

In the wiring harness 1, the housing 2 and the inner wire protecting member 30, 30A constituting the housing 20 hold the protected parts of the plurality of terminal-provided wires 9 inside. However, the housing 2 and the inner wire protecting member 30, 30A may hold only the protected part of one terminal-provided wire 9 inside.

LIST OF REFERENCE SIGNS 1 wiring harness
2 housing (wire protecting member)
9 terminal-provided wire
10 outer wire protecting member (outer member)
11 opening
20 bracket member
21 through hole
22 coupling portion
23 screw hole
30, 30A inner wire protecting member (inner member)
31 base body
32 lid body
90 insulated wire
90A core
90B insulation coating
91 terminal fitting
301 wire accommodating portion
301 through hole
303 terminal enclosing portion
311 accommodating recess
312, 322 wire fixing portion
313 fitting arranging recess
314 projection receiving portion
315 rib inserting portion
321 ceiling plate portion
323 end part of ceiling plate portion
324 coupling projection
325 rib

The invention claimed is:
1. A wiring harness, comprising:
a terminal-provided wire including an insulated wire and a terminal fitting connected to an end of the insulated wire; and
a wire protecting member for covering a protected part including a connected part of the insulated wire and the terminal fitting in the terminal-provided wire, wherein the wire protecting member has a double structure including:
- a non-conductive inner member for holding the protected part of the terminal-provided wire in a pivotable state inside, the inner member is a hard member and includes:
- a fixing portion for fixing and holding a part of the insulated wire spaced from the terminal fitting, and an accommodating portion accommodating with a play at least part of the terminal fitting and the insulated wire between the terminal fitting and the part of the insulated wire held by the fixing portion; and an outer member formed by insert molding a thermoplastic resin material with the inner member holding the terminal-provided wire as an insert part so that the outer member surrounds the fixing part and part of the insulated wire extending from the inner member without impeding movement of the terminal fitting and the part of the insulated wire in the accommodating portion.

2. The wiring harness of claim 1, wherein:
the fixing portion of the inner member is formed with a through hole through which a part of the insulation coating of the terminal-provided wire is passed, and an edge part of the through hole bites into the outer peripheral surface of the insulation coating over the entire circumference.

3. The wiring harness of claim 2, wherein:
the inner member has a different color from the outer member; and
a part of the inner member is exposed from the outer member.

4. The wiring harness of claim 1, wherein:
the inner member has a different color from the outer member; and
a part of the inner member is exposed from the outer member.

\* \* \* \* \*